United States Patent
Culver (10) Patent No.: US 8,256,036 B2
(45) Date of Patent: Sep. 4, 2012

(54) LOCKABLE ASSEMBLY FOR URINAL FLUSH VALVES

(75) Inventor: Jeffrey A. Culver, Sylvania, OH (US)

(73) Assignee: Betoc Corporation, Toledo, OH (US)

( * ) Notice: Subject to any disclaimer, the term of this patent is extended or adjusted under 35 U.S.C. 154(b) by 0 days.

(21) Appl. No.: 13/289,694

(22) Filed: Nov. 4, 2011

(65) Prior Publication Data

US 2012/0110724 A1    May 10, 2012

Related U.S. Application Data (60) Provisional application No. 61/410,550, filed on Nov. 5, 2010.

(51) Int. Cl.
   *E03D 13/00*    (2006.01)
(52) U.S. Cl. ............................................ 4/301
(58) Field of Classification Search .............. 4/301–352, 4/144.1
   See application file for complete search history.

(56) References Cited

U.S. PATENT DOCUMENTS

| | | | |
|---|---|---|---|
| 2,507,966 A | 5/1950 | Filliung, Jr | |
| 3,373,449 A | 3/1968 | Rusnok | |
| 3,556,137 A | 1/1971 | Billeter | |
| 4,868,931 A | 9/1989 | Schneeweiss | |
| 5,195,558 A | 3/1993 | Liang | |
| 5,680,879 A | 10/1997 | Sheih et al. | |
| 5,802,626 A | 9/1998 | Bedana | |
| 5,884,667 A * | 3/1999 | North .............................. | 138/43 |
| 6,041,809 A | 3/2000 | Johnson | |
| 6,560,790 B2 | 5/2003 | Saar et al. | |
| 6,643,853 B2 | 11/2003 | Wilson et al. | |
| 6,671,893 B1 | 1/2004 | Quintana et al. | |
| 6,871,835 B2 | 3/2005 | Parsons | |
| 6,877,170 B1 * | 4/2005 | Quintana et al. ................. | 4/427 |
| 7,111,332 B1 | 9/2006 | Hsia | |
| 7,293,583 B2 * | 11/2007 | Arigoni ..................... | 137/624.11 |
| 7,396,000 B2 * | 7/2008 | Parsons et al. ........... | 251/129.04 |
| 7,549,436 B2 * | 6/2009 | Parsons et al. ............. | 137/15.18 |
| 2006/0162788 A1 | 7/2006 | Arigoni | |
| 2006/0202138 A1 | 9/2006 | Yeh | |

* cited by examiner

*Primary Examiner* — Lori Baker
(74) *Attorney, Agent, or Firm* — MacMillan, Sobanski & Todd, LLC (57) ABSTRACT

A lockable assembly for a urinal valve is provided. The lockable assembly includes a shaft assembly configured to engage portions of the urinal valve and a housing body configured to connect to the urinal valve and further configured to support the shaft assembly for axial movement. The lockable assembly is configured to allow selective operation of the urinal valve between a flushable state and a locked non-flushable state, wherein in a locked non-flushable state, the shaft assembly is prevented from moving in the axial direction and in a flushable state, axial movement of the shaft assembly urges the shaft assembly into contact with portions of the urinal valve.

20 Claims, 7 Drawing Sheets

LOCKABLE ASSEMBLY FOR URINAL FLUSH VALVES

RELATED APPLICATIONS

This application claims the benefit of U.S. Provisional Application No. 61/410,550, filed Nov. 5, 2010, the disclosure of which is incorporated herein by reference.

BACKGROUND

Urinals can include conventional flush valves actuated by levers. The levers can result in a flush of the urinal for each actuation of the lever. In some instances, the urinals can be used extensively, resulting in a large water usage. It would be advantageous if urinal flush valves could be improved to better control the use of water.

SUMMARY OF THE INVENTION

The above objects, as well as other objects not specifically enumerated, are achieved by a lockable assembly for a urinal valve. The lockable assembly includes a shaft assembly configured to engage portions of the urinal valve and a housing body configured to connect to the urinal valve and further configured to support the shaft assembly for axial movement. The lockable assembly is configured to allow selective operation of the urinal valve between a flushable state and a locked non-flushable state, wherein in a locked non-flushable state, the shaft assembly is prevented from moving in the axial direction and in a flushable state, axial movement of the shaft assembly urges the shaft assembly into contact with portions of the urinal valve.

According to this invention there is also provided a urinal. The urinal includes a receptacle configured to collect fluids and a valve in fluid communication with the receptacle. The valve is configured to provide a flushing system for rinsing fluids from surfaces of the receptacle. A lockable assembly is engaged with portions of the valve. The lockable assembly has a shaft assembly and is configured to allow selective operation of the urinal valve between a flushable state and a locked non-flushable state, wherein in a locked non-flushable state, the shaft assembly is prevented from moving in the axial direction and in a flushable state, axial movement of the shaft assembly urges the shaft assembly into contact with portions of the valve.

According to this invention there is also provided a method of controlling the valve of a urinal. The method includes the steps of engaging the valve with a lockable assembly, the lockable assembly having a shaft assembly configured to engage portions of the valve and controlling the operation of the lockable assembly between a manually-operable flushable state and a locked non-flushable state, wherein in a locked non-flushable state, the shaft assembly is prevented from moving in the axial direction and in a flushable state, axial movement of the shaft assembly urges the shaft assembly into contact with portions of the valve.

Various objects and advantages of the lockable assembly for a flush valve will become apparent to those skilled in the art from the following detailed description of the preferred embodiment, when read in light of the accompanying drawings.

DETAILED DESCRIPTION OF THE INVENTION

The present invention will now be described with occasional reference to the specific embodiments of the invention. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

The description and figures disclose a lockable assembly for a urinal flush valve. Generally, the lockable assembly is configured to replace mechanisms for actuating the flushing action of a urinal. Non-limiting examples of actuation mechanisms include lever-operated assembly, push buttons and automatic or sensor actuated mechanisms. The lockable assembly thereby allows selective operation of the urinal flush valve between a manually-operable flushable state and a locked non-flushable state. The term "urinal," as used herein, is defined to mean a receptacle used by males for urinating. The term "flush," as used herein, is defined to rinse through a sudden rush of water. The term "valve," as used herein, is defined to mean any structure, mechanism or device configured to control the flow of a fluid. The term "lockable," as used herein, is defined to mean having a structure capable of being locked.

Figure 1:
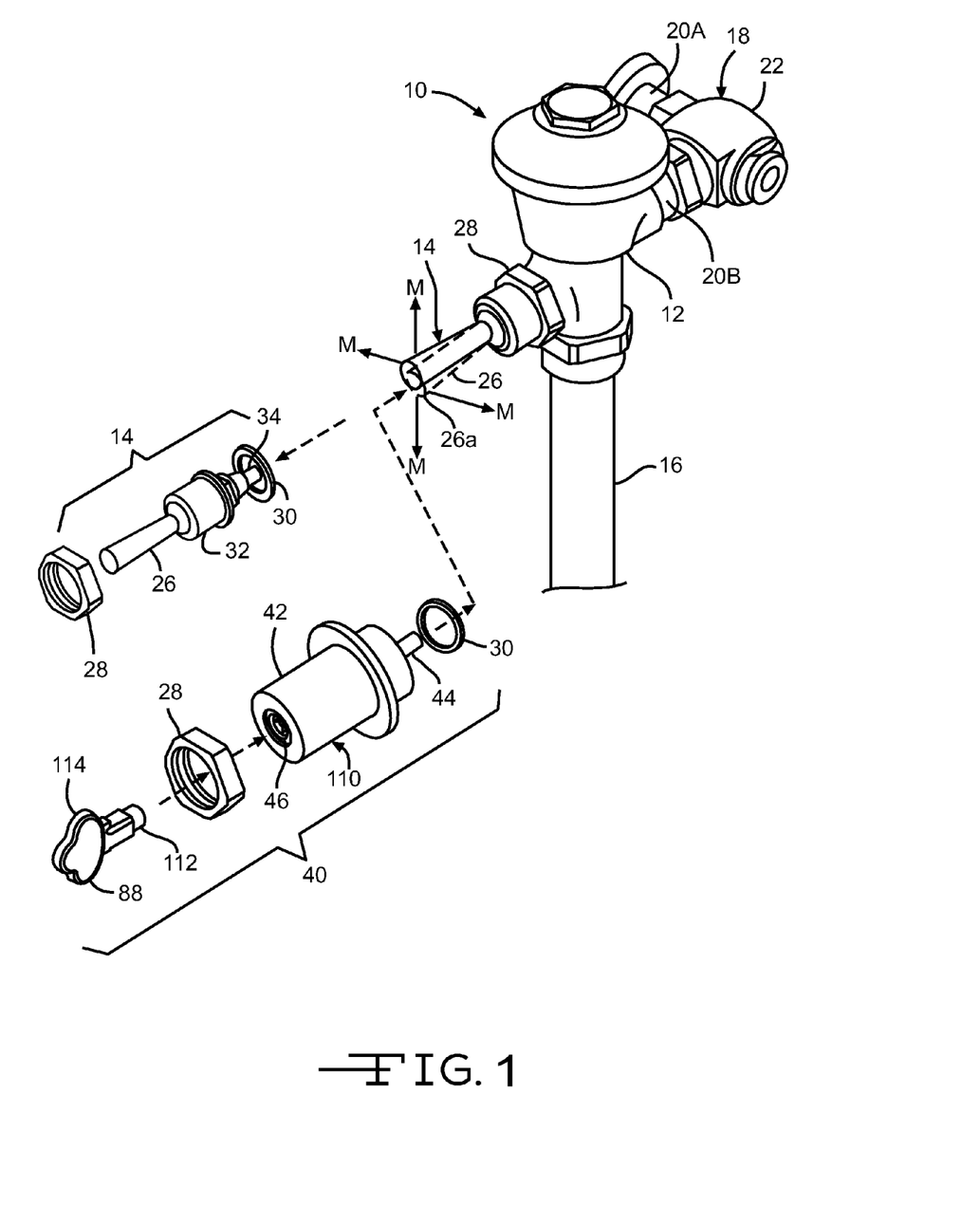
FIG. 1 is a perspective view of a conventional flush valve for a urinal having a lever assembly replaced by a lockable assembly.

Referring now to FIG. 1, a conventional lever-operated flush valve for a urinal is shown generally at 10. Generally, the valve 10 is configured to provide a flushing system for rinsing urine or other fluids from surfaces of the urinal (not shown) upon a manual activation. In certain embodiments, the valve 10 can be a diaphragm type of valve. In other embodiments, the valve 10 can be a piston type of valve. In still other embodiments, the valve 10 can have other types of mechanisms. The valve 10 includes a valve body 12, a lever assembly 14, a sparge pipe 16 and a water inlet assembly 18.

Referring again to the embodiment shown in FIG. 1, the water inlet assembly 18 includes conduits 20A and 20B and one or more couplings 22. The conduits 20A and 20B are configured to channel a flow of water from a water source (not shown) to the valve body 12. In the illustrated embodiment, the conduits 20A and 20B are water pipes. However, in other embodiments, the conduits 20A and 20B can be other structures. The coupling 22 is configured to connect the conduits 20A and 20B together. In the illustrated embodiment, the coupling 22 is a plumbing elbow. Alternatively, the coupling 22 can be other desired structures or fittings, such as for example an adjustment control valve, sufficient to connect the conduits 20A and 20B together. While the illustrated embodiment of the water inlet assembly 18 includes conduits 20A and 20B and one or more couplings 22, it should be appreciated that in other embodiments, the water inlet assembly 18 can include any quantity and type of plumbing fixtures, fittings and/or structures sufficient to channel a flow of water from a water source to the valve body 12.

Referring again to FIG. 1, the lever assembly 14 includes a lever 26, a fastener 28, a sealing member 30, a housing 32 and an actuation piston 34. The lever assembly 14 is conventional in the art and will only be described briefly for purposes of clarification.

Referring again to FIG. 1, in an installed position, the lever assembly 14 is connected to the valve body 12 by the fastener 28, such that the lever 26 extends in a direction away from the valve body 12 and the actuation piston 34 extends into the valve body 12. As indicated in FIG. 1, a first end 26a of the lever 26 is configured for movement in any direction as indicated by the plurality of arrows M. Movement of the first end 26a of the lever 26 causes the actuation piston 34 to move in an axial direction further into the interior of the valve body 12. Movement of the actuation piston 34 in an axial direction further into the interior of the valve body 12 results in actuation of a valve (not shown), also positioned within the interior of the valve body 12. Actuation of the valve results in a flow or flush of water through the sparge pipe 16 and into the urinal (not shown). In some embodiments, the valve positioned within the interior of the valve body 12 includes the structure of a valve head connected to a valve stem, wherein the actuation piston 34 causes the valve stem to displace the valve head from a valve seat. However, the valve positioned within the interior of the valve body 12 can have other structures and can operate in other manners.

As shown in FIG. 1, the sparge pipe 16 is configured to channel a flow of water from the valve body 12 to the urinal (not shown). In the illustrated embodiment, the sparge pipe 16 is a water pipe. However in other embodiments, the sparge pipe 16 can be other structures suitable to channel a flow of flush water from the valve body 12 to the urinal (not shown). While the embodiment shown in FIG. 1 illustrates a sparge pipe 16 as having a substantially uniform diameter along its length, it should be appreciated that in other embodiments, the sparge pipe 16 can have a non-uniform diameter along its length.

Referring again to FIG. 1, in operation, the lever 26 actuates the flush valve 10, thereby causing a flow of flush water to exit the valve body 12 and pass through the sparge pipe 16 to the urinal. Accordingly, the flush valve 10 will cause a flow of flush water to the urinal each and every time the lever 26 is actuated. In some instances, excess manual actuation of the flush valve 10 can result in excess water usage and excess water cost.

Referring again to FIG. 1, the lever assembly 14 of the conventional lever-operated flush valve 10 can be replaced with a lockable assembly for a flush valve 40 (hereafter "lockable assembly"). The lockable assembly 40 is configured to convert the conventional lever-operated flush valve 10 into a flush valve that is selectively operable between a manually-operated flushable state and a locked non-flushable state. The term "selectively operable," as used herein, is defined to mean the lockable assembly 40 can be locked or unlocked, by a user, to provide the desired state. In the unlocked state, the lockable assembly 40 can allow the flush valve (not shown) positioned within the interior of the valve body 12 to be flushed by manual actuation. In the locked state, the flush valve positioned within the interior of the valve body 12 is prevented from flushing by the lockable assembly 40. The lockable feature of the lockable assembly 40 will be discussed in more detail below. The term "user," as used herein, is defined to mean personnel authorized to lock or unlock the lockable assembly 40. A non-limiting example of authorized personnel is facility operating personnel.

Figure 2:
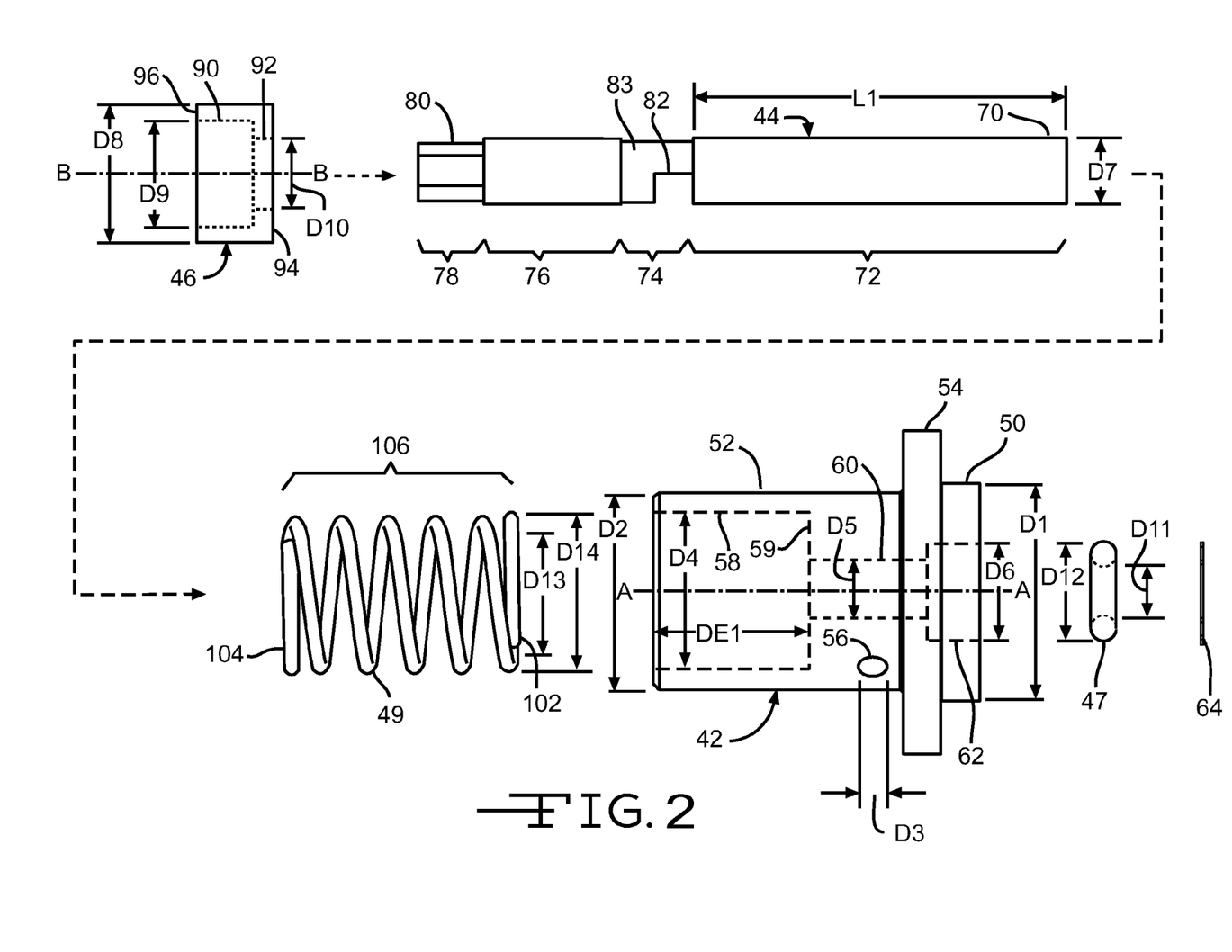
FIG. 2 is a side view, in elevation, of the components of the lockable assembly of FIG. 1.

Referring now to FIGS. 1 and 2, the components forming the lockable assembly 40 are illustrated. The lockable assembly 40 includes a housing body 42, an index pin 44, a retainer cap 46, a sealing member 47, a tension member 49 and a retainer 64.

Referring now to FIG. 2, portions of the housing body 42 are configured for insertion into the valve body 12 and other portions of the housing body 42 are configured as an enclosure for various components of the lockable assembly 40. The housing body 42 includes a first segment 50, a second segment 52 and a third segment 54 extending therebetween. The first segment 50, second segment 52 and third segment 54 are concentric about a major axis A.

Referring again to FIG. 2, the first segment 50 of the housing body 42 is configured for insertion into a corresponding opening (not shown) of the valve body 12. In the illustrated embodiment, the first segment 50 has a circular cross-sectional shape and has an outer diameter D1 of about 0.94 inches. In other embodiments, the first segment 50 can have other cross-sectional shapes and can have an outer diameter D1 of more or less than about 0.94 inches.

The second segment 52 of the housing body 42 is configured as an enclosure for various components of the lockable assembly 40. The second segment 52 includes a first internal passage 58, which will be discussed in more detail below. In the illustrated embodiment, the second segment 52 has a circular cross-sectional shape and has an outer diameter D2 of about 0.94 inches. In other embodiments, the second segment 52 can have other cross-sectional shapes and the outer diameter D2 can be more or less than about 0.94 inches sufficient to include the first internal passage 58.

Figure 3:
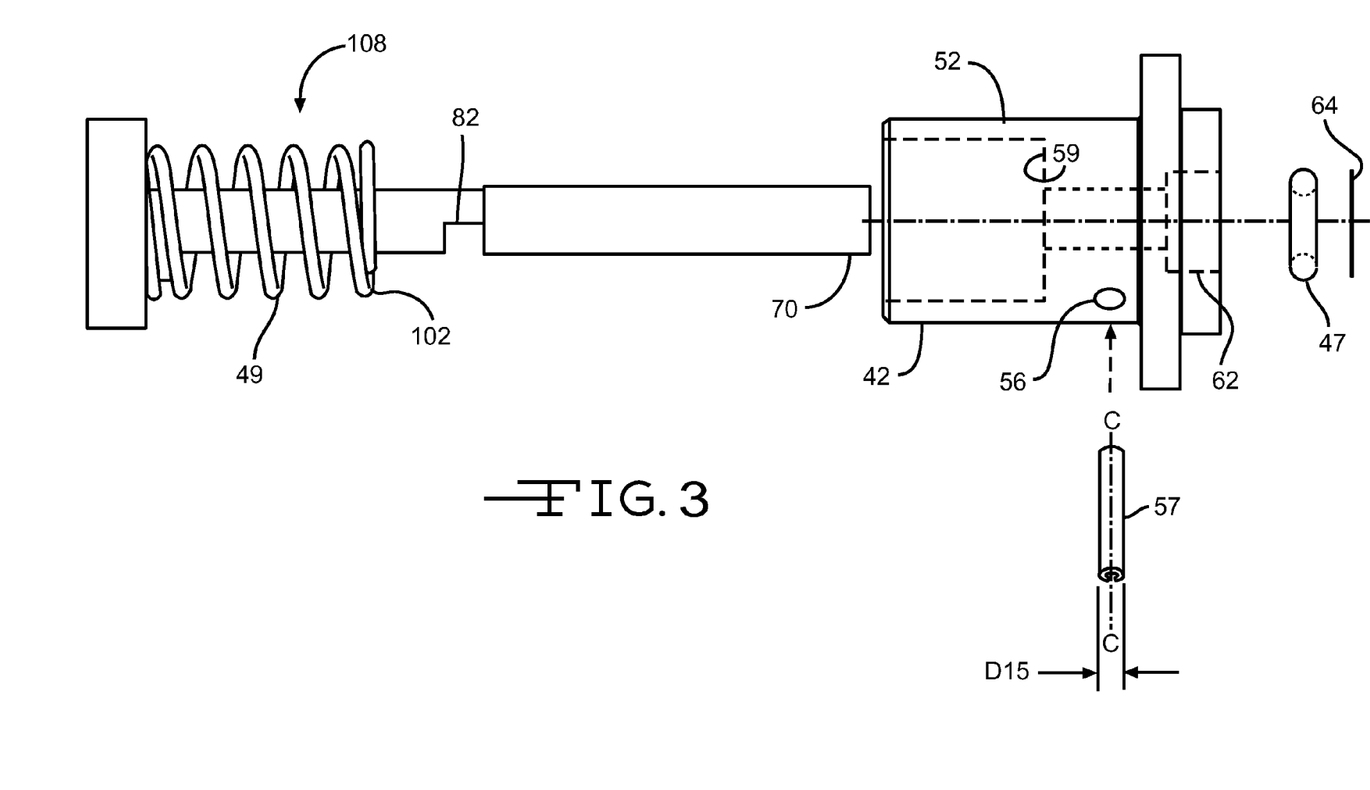
FIG. 3 is a side view, in elevation, of a shaft assembly and housing body forming the lockable assembly of FIG. 1.

The second segment includes an aperture 56. The aperture 56 has an inner diameter D3 sufficient for retention of a locking pin 57 as shown in FIG. 3. Referring again to embodiment illustrated in FIG. 2, the aperture 56 has a circular cross-sectional shape and the inner diameter D3 is about 0.19 inches. In other embodiments, the aperture 56 can have other cross-sectional shapes and the inner diameter D3 can be more or less than about 0.19 inches sufficient for retention of the locking pin 57. The aperture 56 will be discussed in more detail below.

The third segment 54 of the housing body 42 extends in a radial direction from the housing body 42 and is configured as a flange for placement against a mating surface (not shown) of the valve body 12. The third segment 54 acts to limit the insertion depth of the first segment 50 of the housing body 42. In the illustrated embodiment, the third segment 54 has a circular cross-sectional shape. In other embodiments, the third segment 54 can have other cross-sectional shapes and can have any desired diameter sufficient to form a flange for placement against a mating surface (not shown) of the valve body 12.

Referring again to FIG. 2, the first internal passage 58, concentric with the major axis A, extends into the second segment 52 a depth DE1 such as to form a shoulder 59 within the second segment 52. The shoulder 59 will be discussed in more detail below. The first internal passage has an inner diameter D4 sufficient to house the tension member 49. In the illustrated embodiment, the first internal passage 58 has a circular cross-sectional shape, a depth DE1 of about 0.77 inches and an inner diameter D4 of about 0.625 inches. In other embodiments, the first internal passage 58 can have other cross-sectional shapes, a depth DE1 of more or less than about 0.77 inches and an inner diameter D4 of more or less than about 0.625 inches.

A second internal passage 60, concentric with the major axis A, extends within the housing body 42 from the shoulder 59 formed by the first internal passage 58 into the third segment 54. The second internal passage 60 has an inner diameter D5 sufficient to allow insertion of the index pin 44 through the first, second and third segments, 50, 52 and 54, of the housing body and further sufficient to allow axial movement of the index pin 44 relative to the housing body 42. In the illustrated embodiment, the second internal passage 60 has a circular cross-sectional shape and has an inner diameter D5 of about 0.252 inches. In other embodiments, the second internal passage 60 can have other cross-sectional shapes and the inner diameter D5 can be more or less than about 0.252 inches sufficient to allow insertion of the index pin 44 through the first, second and third segments, 50, 52 and 54, of the housing body and further sufficient to allow axial movement of the index pin 44 relative to the housing body 42.

Referring again to FIG. 2, a third internal passage 60, concentric with the major axis A, extends within the housing body 42 from the second internal passage 60 through the first segment 50. The third internal passage 62 has an inner diameter D6 sufficient to contain the sealing member 47 and the retainer 64 and further sufficient to allow axial movement of the index pin 44 relative to the housing body 42. In the illustrated embodiment, the third internal passage 62 has a circular cross-sectional shape and has an inner diameter D6 of about 0.53 inches. In other embodiments, the third internal passage 62 can have other cross-sectional shapes and the inner diameter D6 can be more or less than about 0.53 inches sufficient to contain the sealing member 47 and the retainer 64 and further sufficient to allow axial movement of the index pin 44 relative to the housing body 42. The first, second and third internal passages, 58, 60 and 62, will be discussed in more detail below.

In the embodiment illustrated in FIG. 2, the housing body 42 is made from corrosion-resistant materials, such as the non-limiting examples of stainless steel or brass. However, in other embodiments, the housing body 42 can be made from other corrosion-resistant materials, such as for example, polyethylene. While the embodiment illustrated in FIG. 2 shows the housing body 42 as a one-piece structure, it should be appreciated that in other embodiments, the housing body 42 can be assembled from discrete components. The housing body 42 can have any desired surface finish including the non-limiting examples of chrome or cadmium plating.

Referring again to FIG. 2, the index pin 44 is configured for rotation relative to the housing body 42 and further configured for movement in an axial direction relative to the housing body 42. Rotational movement of the index pin 44 alternatively locks or unlocks the axial movement of the index pin 44 relative to the housing body 42. Axial movement of the index pin 44 in the direction toward the valve body 12 results in actuation of a valve (not shown) positioned within the interior of the valve body 12. The index pin 44 has an outer diameter D7. In the illustrated embodiment, the outer diameter D7 is about 0.25 inches. In other embodiments, the outer diameter D7 can be more or less than about 0.25 inches.

The index pin 44 includes a first end 70, an extension segment 72, a lock segment 74, an intermediate segment 76 and a key segment 78.

Referring again to FIG. 2, the first end 70 of the extension segment 72 has a shape of a substantially flat surface. The flat surface of the first end 70 is configured to engage portions of the flush valve, such as for example a valve stem, within the interior of the valve body 12. In other embodiments, the first end 70 of the index pin 44 can have other shapes, such as the non-limiting example of an arcuate shape, sufficient to engage portions of the flush valve within the interior of the valve body 12.

The extension segment 72 of the index pin 44 extends from the lock segment 74 to the first end 70 a length L1 sufficient to allow the first end 70 of the index pin 44 to engage portions of the flush valve within the interior of the valve body 12. In the illustrated embodiment, the length L1 is in a range of from about 0.80 inches to about 1.20 inches. In other embodiments, the length L1 can be less than about 0.80 inches or more than about 1.20 inches. In still other embodiments, such as for example when the valve body 12 or portions of the valve body 12 are concealed behind walls, the extension segment 72 can have a length L1 of about 10.0 inches to 16.0 inches or more.

Referring again to FIG. 2, the lock segment 74 extends from the extension segment 72 to the intermediate segment 76. The lock segment 74 includes a groove 82 adjacent a flat 83. As shown in FIG. 2, the groove 82 and a portion of the flat 83 are within the same vertical plane, with the groove 82 orientated at a generally perpendicular angle with the flat 83. Accordingly, when the index pin 44 is in an installed position within the housing body 42, the vertical plane containing the groove 82 and a portion of the flat 83 aligns with the locking pin 57. In this position, rotation of the index pin 44 is used to selectively engage or disengage the locking pin 57 with the groove 82 or with the flat 83. In one example, rotation of the index pin 44 engages the groove 82 with the locking pin 57 such as to prevent movement of the index pin 44 in an axial direction. In another example, rotation of the index pin 44 disengages the groove 82 with the locking pin 57 such that the locking pin 57 now aligns with the portion of the flat 83. In this position, the index pin 44 is capable of movement in an axial direction.

Referring again to FIG. 2, the groove 82 has a depth DE2 sufficient to allow engagement with the locking pin 57. In the illustrated embodiment, the depth DE2 is about 0.13 inches. Alternatively, the depth DE2 can be more or less than about 0.13 inches provided the depth DE2 is sufficient to allow engagement with the locking pin 57.

While the embodiment illustrated in FIG. 2 shows the groove 82 as having a generally square cross-sectional shape, it should be appreciated that in other embodiments, the groove 82 can have other cross-sectional shapes, such as the non-limiting example of an arcuate cross-sectional shape, sufficient to engage the locking pin 57.

The key segment 78 extends from the intermediate segment 76 to a second end 80 of the index pin 44. The key segment 78 is configured to have a shape that cooperates with a shape of a portion of the key 88, as shown in FIG. 1, such that rotation of the key 88 forces rotation of the index pin 44. In the illustrated embodiment, the key segment 78 is formed such as to have a hexagonal cross-sectional shape, corresponding to a hexagonal shape of a portion of the key 88. However, in other embodiments, the key segment 78 can have other cross-sectional shapes, such as for example, square, rectangular, triangular or star cross-sectional shapes.

In the illustrated embodiment, the index pin 44 is made from corrosion-resistant materials, such as the non-limiting example of stainless steel. However, in other embodiments, the index pin 44 can be made from other corrosion-resistant materials, such as for example, brass or polyethylene. The index piston 44 can have any desired surface finish including the non-limiting examples of chrome or cadmium plating.

The retainer cap 46 is configured for attachment to the intermediate segment 76 of the index pin 44 and further configured for positioning within the inner diameter D4 of the first internal passage 58 of the housing body 42. In the illustrated embodiment, the retainer cap 46 has a circular cross-sectional shape and an outer diameter D8 of about 0.62 inches. In other embodiments, the retainer cap 46 can have other cross-sectional shapes, generally corresponding to the cross-sectional shape of the first passage 58 and can have an outer diameter D8 of more or less than about 0.62 inches.

The retainer cap 46 has a first internal passage 90 in communication with a second internal passage 92. The first internal passage 90 is configured to provide a circumferential clearance between the hexagonal cross-sectional shaped second end 80 of the index pin 44 and an interior surface of the first internal passage 90. In the illustrated embodiment, the first internal passage has a circular cross-sectional shape and an inner diameter D9 of about 0.375 inches. In other embodiments, the first internal passage 90 can have other cross-sectional shapes and the inner diameter D9 can be more or less than about 0.375 inches sufficient to provide a circumferential clearance between the hexagonal cross-sectional shaped second end 80 of the index pin 44 and an interior surface of the first internal passage 92.

The second internal passage 92 has a cross-sectional shape and an inner diameter D10 that generally corresponds to the cross-sectional shape of the index pin 44 and the outer diameter D7 of the index pin 44. In the illustrated embodiment, the second internal passage 92 has a circular cross-sectional shape and an inner diameter D10 of about 0.25 inches. In other embodiments, the second internal passage 92 can have other cross-sectional shapes and the diameter D10 can be more or less than about 0.25 inches sufficient to generally correspond to the outer diameter D7 of the index pin 44.

The retainer cap 46 has a first end 94 and a second end 96. The first and second ends, 94 and 96, of the retainer cap 46 will be discussed in more detail below.

In the embodiment illustrated in FIG. 2, the retainer cap 46 is made from corrosion-resistant materials, such as the non-limiting examples of stainless steel or brass. However, in other embodiments, the retainer cap 46 can be made from other corrosion-resistant materials, such as for example, polyethylene. While the embodiment illustrated in FIG. 2 shows the retainer cap 46 as a one-piece structure, it should be appreciated that in other embodiments, the retainer cap 46 can be assembled from discrete components. The retainer cap 46 can have any desired surface finish including the non-limiting examples of chrome or cadmium plating.

Referring again to FIG. 2, the sealing member 47 is configured to seat over the extension segment 72 of the index pin 44 and further configured to slidably seal against the interior surface of the third interior passage 62 of the housing body 42. The sealing member 47 has an inner diameter D11 that generally corresponds to the outer diameter D7 of the index pin 44 and an outer diameter D12 that generally corresponds to the inner diameter D6 of the third interior passage 62. In the illustrated embodiment, the inner diameter D11 is about 0.24 inches and the outer diameter D12 is about 0.385 inches. In other embodiments, the sealing member 47 can have an inner diameter D11 more or less than about 0.24 inches sufficient to correspond to the outer diameter D7 of the index pin 44, and an outer diameter D12 more or less than about 0.385 inches sufficient to correspond to the inner diameter D6 of the third interior passage 62.

In the embodiment illustrated in FIG. 2, the sealing member 47 is configured to seal water having pressures in a range of from about 40 pounds per square inch (psi) to about 80 psi. In other embodiments, the sealing member 47 can be configured to seal water pressures less than about 40 psi or more than about 80 psi. In the illustrated embodiment, the sealing member 47 is formed from a polymeric material, such as the non-limiting example of neoprene. Alternatively, in other embodiments the sealing member 47 can be formed from other desired materials, such as for example silicone-based materials.

While the embodiment illustrated in FIG. 2 shows a single sealing member 47, it should be appreciated that in other embodiments, more than one sealing member 47 can be used.

Referring again to FIG. 2, the tension member 49 has a first end 102, a second end 104 and an intermediate portion 106. As will be discussed in more detail below, the first end 102 has a substantially flat surface configured to seat against the shoulder 59 within the second segment 52 of the housing body 42. Similarly, the second end 104 of the tension member 49 has a substantially flat surface configured to seat against the first end 94 of the retainer cap 46. The intermediate portion 106 of the tension member 49 is configured for compression and expansion as will be discussed in more detail below.

The tension member 49 has an inner diameter D13 that generally corresponds to the outer diameter D7 of the index pin 44 and an outer diameter D14 that generally corresponds to the inner diameter D4 of the first passage 58. In the illustrated embodiment, the inner diameter D13 is about 0.510 inches and the outer diameter D14 is about 0.60 inches. In other embodiments, the inner diameter D13 can be more or less than about 0.510 inches, sufficient to correspond to the outer diameter D7 of the index pin 44, and the outer diameter D14 can be more or less than about 0.60 inches, sufficient to correspond to the inner diameter D4 of the first passage 58.

While the embodiment of the tension member 49 shown in FIG. 2 shows a helical spring, it should be appreciated that in other embodiments the tension member 49 can be other structures, mechanisms or devices, such as for example leaf springs, pneumatic springs or elastomeric fluids.

Referring now to FIGS. 2 and 3, assembly of the lockable assembly 40 will now be described. In a first step, the second internal passage 92 of the retainer cap 46 is aligned with the intermediate segment 76 of the index pin 44 such that the second end 80 of the index pin 44 aligns with the second end 96 of the retainer cap 46. In certain embodiments, the retainer cap 46 is retained in this position as the result of an interference fit between the retainer cap 46 and the index pin 44. In other embodiments, the retainer cap 46 can be retained in this position with other methods, including the non-limiting examples of adhesive or brazing. In a next step, the first end 70 of the index pin 44 is slid through the tension member 49 such that the second end 104 of the tension member 49 seats against the first end 94 of the retainer cap 46. The assembly of the index pin 44, retainer cap 46 and tension member 49 forms a shaft assembly 108 as shown in FIG. 3.

Referring now to FIG. 3, the shaft assembly 108 is inserted into the housing body 42 such that the first end 70 of the index pin 44 extends through the third passage 62 and the first end 102 of the tension member 49 seats against the shoulder 59 within the second segment 52 of the housing body 42. In this position, the second end of the retainer cap 46 aligns with the end of the second segment 52 of the housing body 42. Also in this position, the groove 82 of the lock segment 74 of the index pin 44 aligns with the aperture 56 of the second segment 52 of the housing body 42. The shaft assembly 108 is retained in this installed position within the housing body 42 by the locking pin 57. As shown in FIG. 3, the locking pin 57 is inserted into the aperture 56 of the second segment 52 such as to mate with the groove 82 or flat 83. Mating of the locking pin 57 with the groove 82 or the flat 83 acts to lock the shaft assembly 108 within the housing body 42. In a next step, the sealing member 47 is installed over the first end 70 of the index pin 44 and positioned within the inner diameter D6 of the third passage 62. Finally, the retainer 64 is installed over the first end 70 of the index pin 44 and positioned within the inner diameter D6 of the third passage 62 such as to lock the sealing member 47 within the third passage 62. In the illustrated embodiment, the retainer 64 is a lock washer. However, in other embodiments, the retainer 64 can be other structures or devices, such as the non-limiting example of a lock ring. Assembly of the shaft assembly 108, sealing member 47 and retainer 64 within the housing body 42 forms a valve assembly 110 as shown in FIG. 1.

Referring again to FIG. 3, the locking pin 57 has a longitudinal axis C. The locking pin 57 is seated within the aperture 56 such that the axis C is substantially perpendicular to the index piston 44. In this position, the locking pin 57 is positioned to allow engagement with the groove 82 or the flat 83 of the index pin 44 as the index pin 44 rotates relative to the housing body 42. In the illustrated embodiment, the locking pin 57 is a roll pin having a circular cross-sectional shape. In other embodiments, the locking pin 57 can be other structures and can have other cross-sectional shapes.

The locking pin 57 has an outer diameter D15 that generally corresponds to the inner diameter D3 of the aperture 56. In the illustrated embodiment, the outer diameter D15 is approximately 0.126 inches. In other embodiments, the outer diameter D15 can be more or less than 0.126 inches, sufficient to generally correspond to the inner diameter D3 of the aperture 56.

In the illustrated embodiment, the locking pin 57 is formed from a corrosion-resistant material, such as the non-limiting examples of stainless steel. However, in other embodiments, the locking pin 57 can be formed from other corrosion-resistant materials, such as for example, titanium. The locking pin 57 can have any desired surface finish including the non-limiting examples of chrome or cadmium plating.

Referring again to FIG. 1, the key 88 includes a tubular portion 112 connected to a bow portion 114. The tubular portion 112 has a hollow internal cross-sectional shape that generally corresponds with the cross-sectional shape of the second end 80 of the index pin 44. Accordingly, the tubular portion 112 of the key 88 can mate with the second end 80 of the index pin 44. In the illustrated embodiment, the internal portion of the tubular portion 112 has a six-sided cross-sectional shape that approximates the hexagonal cross-sectional shape of the second end 80 of the index pin 44. In other embodiments, the internal portion of the tubular portion 112 can have other internal cross-sectional shapes that generally correspond to the second end 80 of the index pin 44. The bow portion 114 is configured to allow a user to apply torque to the tubular portion 112. Applying torque to the tubular portion 112 results in torque being applied to the index pin 44. Torque applied to the index pin 44 results in rotational movement of the index pin 44, thereby providing the locking and unlocking feature of the lockable assembly 40.

Figure 4:
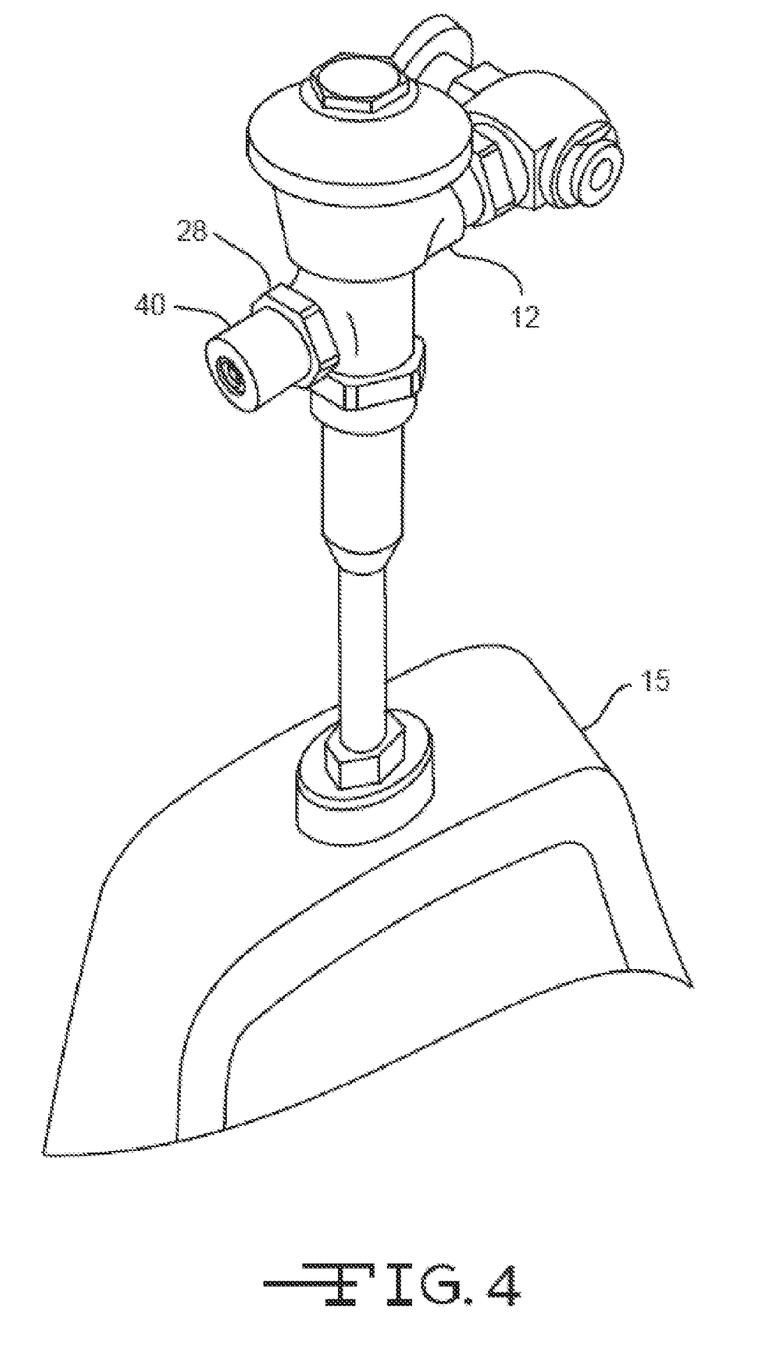
FIG. 4 is a perspective view of the lockable assembly of FIG. 1 illustrated in an installed position.

Referring again to FIG. 1 and as discussed above, the lockable assembly for a flush valve 40 is configured to replace the lever-operated assembly 14 for a conventional urinal flush valve, thereby allowing selective operation of the urinal flush valve between a manually-operated flushable state and a locked non-flushable state. The replacement of the lever-operated assembly 14 with the lockable assembly 40 is accomplished by first removing the lever-operated assembly 14 from the valve body 12. A replacement sealing member 30 and the lockable assembly 40 are inserted into the opening in the valve body 12 vacated by the lever-operated assembly 14, such that the first end 70 of the index pin 44 extends into the valve body 12 and can engage the flush valve (not shown). The lockable assembly 40 is further positioned against the valve body 12 such that the third segment 54 of the housing body 42 seats against a boss (not shown) within the valve body 12. The fastener 28 is used to secure the lockable assembly 40 in position against the valve body 12. The resulting lockable assembly 40, secured in position against the valve body 12, is shown in FIG. 4 in relation to a urinal 15.

In operation, a user determines the desired operational state of the lockable assembly 40. In a first state, the user locks the lockable assembly 40 by rotating the key 88 until the groove 82 in the lock segment 74 of the index pin 44 engages the locking pin 57. In a locked state, the index pin 44 cannot move in an axial direction, thereby preventing engagement with the flush valve within the interior of the valve body 12. Accordingly, in a locked state, the flush valve within the valve body 12 cannot be manually actuated.

In a second state, the user unlocks the lockable assembly 40 by rotating the key 88 until the locking pin 57 aligns with the flat 83 of the lock segment 74 of the index pin 44. In the unlocked state, the index pin 44 is free to move in an axial direction. Accordingly, depression of the retainer cap 46 urges the index pin 44 to move in an axial direction, and the first end 70 of the index pin 44 engages with the flush valve within the valve body 12. In an unlocked state, the flush valve within the valve body 12 can be manually actuated each time the retainer cap 46 is depressed. Depression of the retainer cap 46 results in a resistive tension applied by the tension member 49, which urges the index pin 44 back into a non-engaged position.

While the embodiment shown in FIGS. 1, 2 and 3 and discussed above provides for an axial alignment of the index pin 44 and the key 88, it should be appreciated that in other embodiments, the index pin 44 and a device for locking and unlocking the index pin 44 can be configured in non-axial arrangements.

While the embodiment illustrated in FIGS. 2, 3a and 3b and discussed above provides for replacement of the lever-operated assembly 14 within the valve body 12 with the lockable assembly 40, it should be appreciated that in other embodiments, the lockable assembly 40 can replace or be incorporated with or into other flush valve-related structures, devices and mechanisms, such as the non-limiting example of an automatic flush valve mechanism. One example of a conventional automatic flush valve mechanism is an automatic flush valve mechanism mounted to the side or upper portion of the valve body. The automatic flush mechanism is typically configured to provide automatic actuation of the flush valve triggered by different mechanisms or systems, including the non-limiting examples of infrared sensors, proximity sensors or timers.

Another example of a conventional automatic flush valve mechanism is an automatic flush valve mechanism mounted to a wall adjacent to the valve body. In this example, the flush valve mechanism can be hidden from view. The automatic actuation of the flush valve can be triggered by different mechanisms as discussed above.

Figure 5:
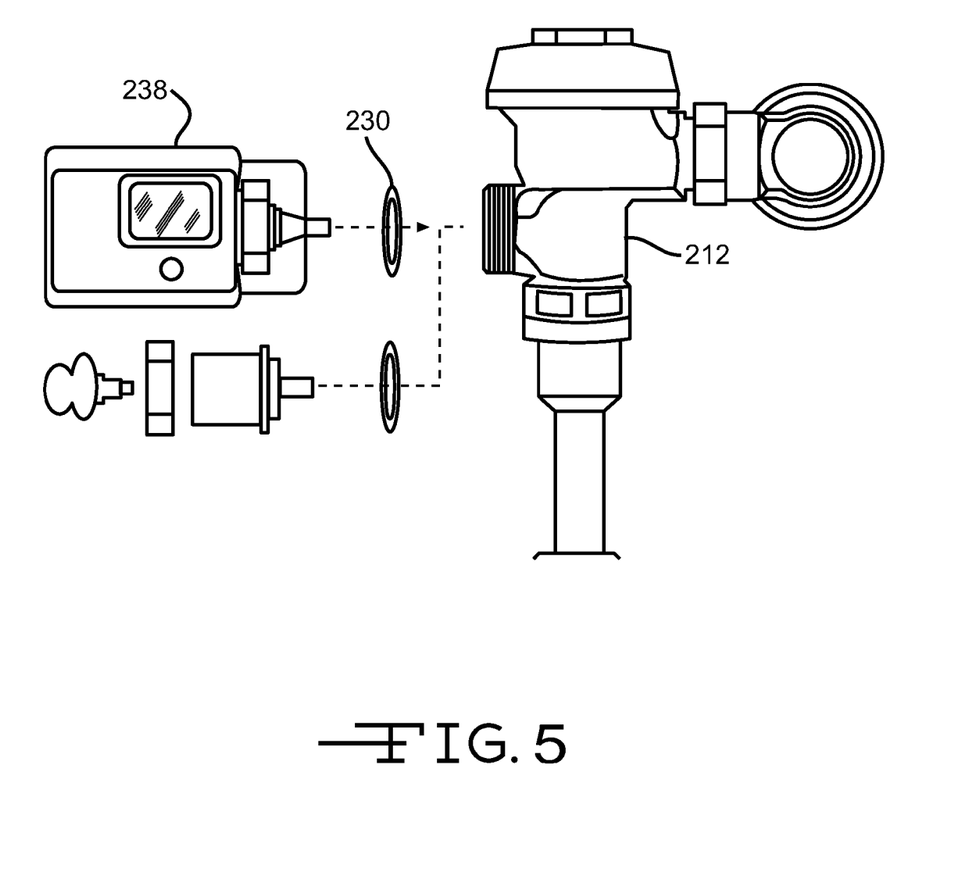
FIG. 5 is a side view, in elevation, of a lockable assembly configured to replace an automatic flush mechanism.

As discussed above, the lockable assembly can replace or be incorporated with or into other conventional automatic flush valve-related structures, devices and mechanisms. Accordingly, the function of allowing selective operation of the urinal flush valve between the automatic state and a locked non-flushable state can be incorporated into the various automatic flushing mechanisms. Referring first to the embodiment illustrated in FIG. 5, a valve body 212 having an automatic flush valve mechanism 238 and sealing member 230 is illustrated. In this embodiment, the automatic flush valve mechanism 238 and the sealing member 230 are removed and subsequently replaced with a lockable assembly 240 and a sealing member 230. In the illustrated embodiment, the lockable assembly 240 and the sealing member 230 are the same as, or similar to, the lockable assembly 40 and the sealing member 30 illustrated in FIG. 1 and described above. In other embodiments, the lockable assembly 240 and the sealing member 230 can be different from the lockable assembly 40 and the sealing member 30. The lockable assembly 240 operates as discussed above for the lockable assembly 40.

Figure 6:
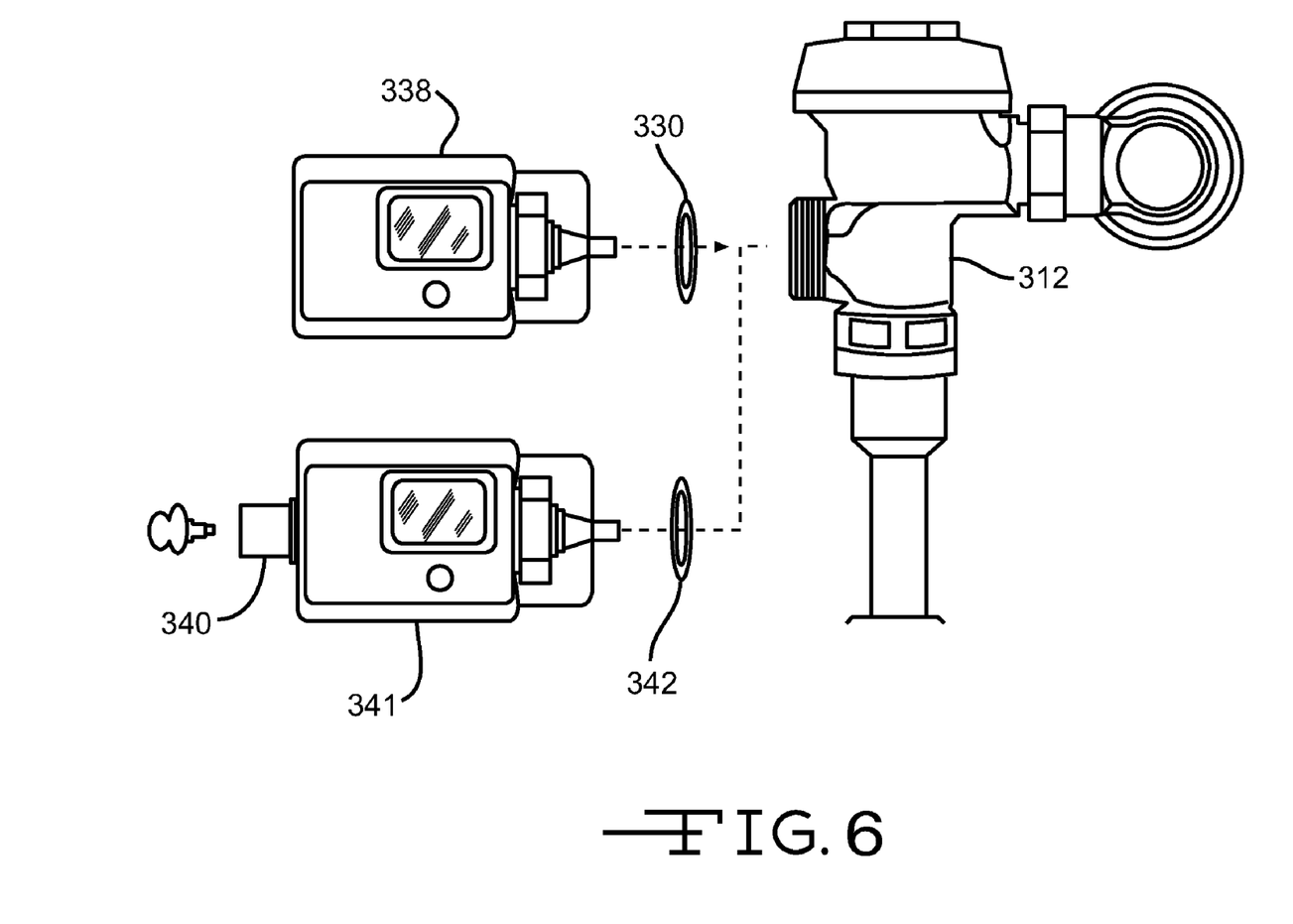
FIG. 6 is a side view, in elevation, of an automatic flush mechanism configured to include the lockable assembly of FIG. 1.

Referring now to FIG. 6, another embodiment of incorporating the lockable assembly into an automatic flush valve mechanism is illustrated. In this embodiment, the existing automatic flush valve mechanism 338 and sealing member 330 are removed from the valve body 312 and subsequently replaced with an automatic valve mechanism 341 and sealing member 342. The automatic valve mechanism 341 includes a lockable assembly 340 such as to provide selective operation of the urinal flush valve between the automatic state and a locked non-flushable state. In the illustrated embodiment, the lockable assembly 340 and the sealing member 342 are the same as, or similar to, the lockable assembly 40 and the sealing member 30 illustrated in FIG. 1 and described above. In other embodiments, the lockable assembly 340 and the sealing member 342 can be different from the lockable assembly 40 and the sealing member 30.

Figure 7:
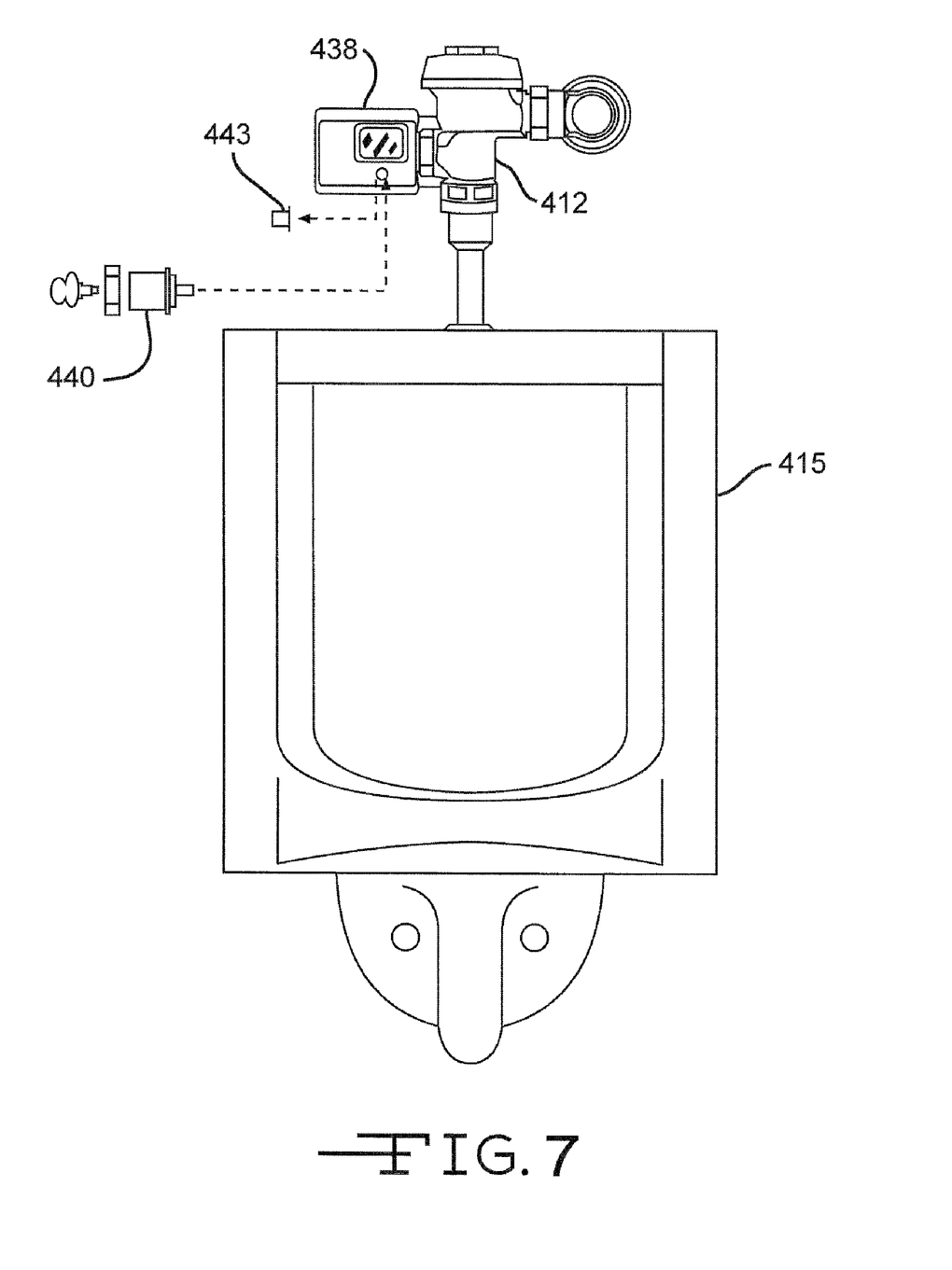
FIG. 7 is a side view, in elevation, of a lockable assembly configured to replace a manually-operated push button within an automatic flush mechanism.

Referring now to FIG. 7, another embodiment of an incorporated lockable assembly into an automatic flush valve mechanism is illustrated. A urinal 415 with a valve body 412 having an automatic flush valve mechanism 438 is illustrated. The automatic flush valve mechanism 438 includes a manually-operated push button 443. The manually-operated push button 443 is configured to provide an alternate flush option that is independent of the automatic flush valve operation. In this embodiment, the manually-operated push button 443 is removed from the automatic flush valve mechanism 438 and subsequently replaced with a lockable assembly 440 such as to provide selective operation of the urinal flush valve between the automatic state and a locked non-flushable state. In the illustrated embodiment, the lockable assembly 440 is the same as, or similar to, the lockable assembly 40 illustrated in FIG. 1 and described above. In other embodiments, the lockable assembly 440 can be different from the lockable assembly 40. While the manually-operated push button 443 is shown in FIG. 8 as being positioned in the front of the automatic flush valve mechanism 438, it should be appreciated that manually-operated push button 443 can be positioned in other locations of the automatic flush valve mechanism 438, such as for example, the side or back of the automatic flush valve mechanism 438.

While the embodiment illustrated in FIG. 7 shows the replacement of the manually-operated push button 443 with the lockable assembly 440, it should be appreciated that in other embodiments, the manually-operated push button 443 can be replace with other structures, mechanisms and devices sufficient to provide selective operation of the urinal flush valve between the automatic state and a locked non-flushable state. One non-limiting example of an alternative structure is a lockable key switch (not shown). Upon actuation by an actuation key, the lockable key switch can be configured to provide selective operation of the urinal flush valve between the automatic state and a locked non-flushable state.

While the embodiment illustrated in FIG. 7 shows the removal of the manually-operated push button 443, it should be appreciated that in other embodiments, a lockable assembly 440 can be added to the automatic flush valve mechanism 338 such that the lockable assembly 440 provide an alternate flush option that is independent of the automatic flush valve operation. In this embodiment, a lockable assembly 440 is incorporated into the automatic flush valve mechanism 438 such as to disable the existing manually-operated push button and further to provide selective operation of the urinal flush valve between the automatic state and a locked non-flushable state. In the illustrated embodiment, the lockable assembly 440 is the same as, or similar to, the lockable assembly 40 illustrated in FIG. 1 and described above. In other embodiments, the lockable assembly 440 can be different from the lockable assembly 40.

While the lockable assembly has been described above as engaging a flush valve, it should be appreciated that in other embodiments, the lockable assembly can be configured to engage any valve, plumbing device or fitting, capable of supplying water to a urinal.

The principle and mode of operation of the lockable assembly for a flush valve have been described in certain embodiments. However, it should be noted that the lockable assembly for a flush valve may be practiced otherwise than as specifically illustrated and described without departing from its scope.

What is claimed is:

1. A lockable assembly for a urinal valve, the lockable assembly comprising:
   a shaft assembly configured to engage portions of the urinal valve; and
   a housing body configured to connect to the urinal valve and further configured to support the shaft assembly for axial movement;
   wherein the lockable assembly is configured to allow selective operation of the urinal valve between an unlocked flushable state and a locked non-flushable state, wherein in a locked non-flushable state, the shaft assembly is prevented from moving in the axial direction and in an unlocked flushable state, axial movement of the shaft assembly urges the shaft assembly into contact with portions of the urinal valve.

2. The lockable assembly of claim 1, wherein the axial movement of the shaft assembly is manually actuated.

3. The lockable assembly of claim 1, wherein the shaft assembly is configured for a locked position as the result of a locking pin aligning with a groove in the shaft assembly.

4. The lockable assembly of claim 1, wherein the lockable assembly is configured to replace a lever operated flush valve system.

5. The lockable assembly of claim 1, wherein the lockable assembly is incorporated into an automatic flush valve system.

6. The lockable assembly of claim 1, wherein the lockable assembly is incorporated into an automatic flush valve system having an existing manual push button.

7. The lockable assembly of claim 1, wherein the shaft assembly includes a retainer cap, an index pin and a tension member.

8. A urinal comprising:
a receptacle configured to collect fluids;
a valve in fluid communication with the receptacle, the valve configured to provide a flushing system for rinsing fluids from surfaces of the receptacle; and
a lockable assembly engaged with portions of the valve, the lockable assembly having a shaft assembly, the lockable assembly configured to allow selective operation of the urinal valve between an unlocked flushable state and a locked non-flushable state, wherein in a locked non-flushable state, the shaft assembly is prevented from moving in the axial direction and in an unlocked flushable state, axial movement of the shaft assembly urges the shaft assembly into contact with portions of the valve.

9. The urinal of claim 8, wherein the axial movement of the shaft assembly is manually actuated.

10. The urinal of claim 8, wherein the shaft assembly is configured for a locked position as the result of a locking pin aligning with a groove in the shaft assembly.

11. The urinal of claim 8, wherein the lockable assembly is configured to replace a lever operated flush valve system.

12. The urinal of claim 8, wherein the lockable assembly is incorporated into an automatic flush valve system.

13. The urinal of claim 8, wherein the lockable assembly is incorporated into an automatic flush valve system having an existing manual push button.

14. The urinal of claim 8, wherein the shaft assembly includes a retainer cap, an index pin and a tension member.

15. A method of controlling the valve of a urinal, the method comprising the steps of:
engaging the valve with a lockable assembly, the lockable assembly having a shaft assembly configured to engage portions of the valve;
controlling the operation of the lockable assembly between a manually-operable unlocked flushable state and a locked non-flushable state, wherein in a locked non-flushable state, the shaft assembly is prevented from moving in the axial direction and in an unlocked flushable state, axial movement of the shaft assembly urges the shaft assembly into contact with portions of the valve.

16. The method of claim 15, wherein the axial movement of the shaft assembly is manually actuated.

17. The method of claim 15, wherein the shaft assembly is configured for a locked position as the result of a locking pin aligning with a groove in the shaft assembly.

18. The method of claim 15, wherein the lockable assembly is configured to replace a lever operated flush valve system.

19. The method of claim 15, wherein the lockable assembly is incorporated into an automatic flush valve system.

20. The method of claim 15, wherein the lockable assembly is incorporated into an automatic flush valve system having an existing manual push button.

* * * * *

UNITED STATES PATENT AND TRADEMARK OFFICE
CERTIFICATE OF CORRECTION

| | |
|---|---|
| PATENT NO. | : 8,256,036 B2 |
| APPLICATION NO. | : 13/289694 |
| DATED | : September 4, 2012 |
| INVENTOR(S) | : Culver |

It is certified that error appears in the above-identified patent and that said Letters Patent is hereby corrected as shown below:

On the title page item (73),

"Betoc Corporation" should read "Betco Corporation".

Signed and Sealed this
Sixth Day of November, 2012

David J. Kappos
*Director of the United States Patent and Trademark Office*